Jan. 19, 1937.  S. D. MURPHY ET AL  2,068,564
METALWORKING APPARATUS
Original Filed May 28, 1935   3 Sheets-Sheet 1
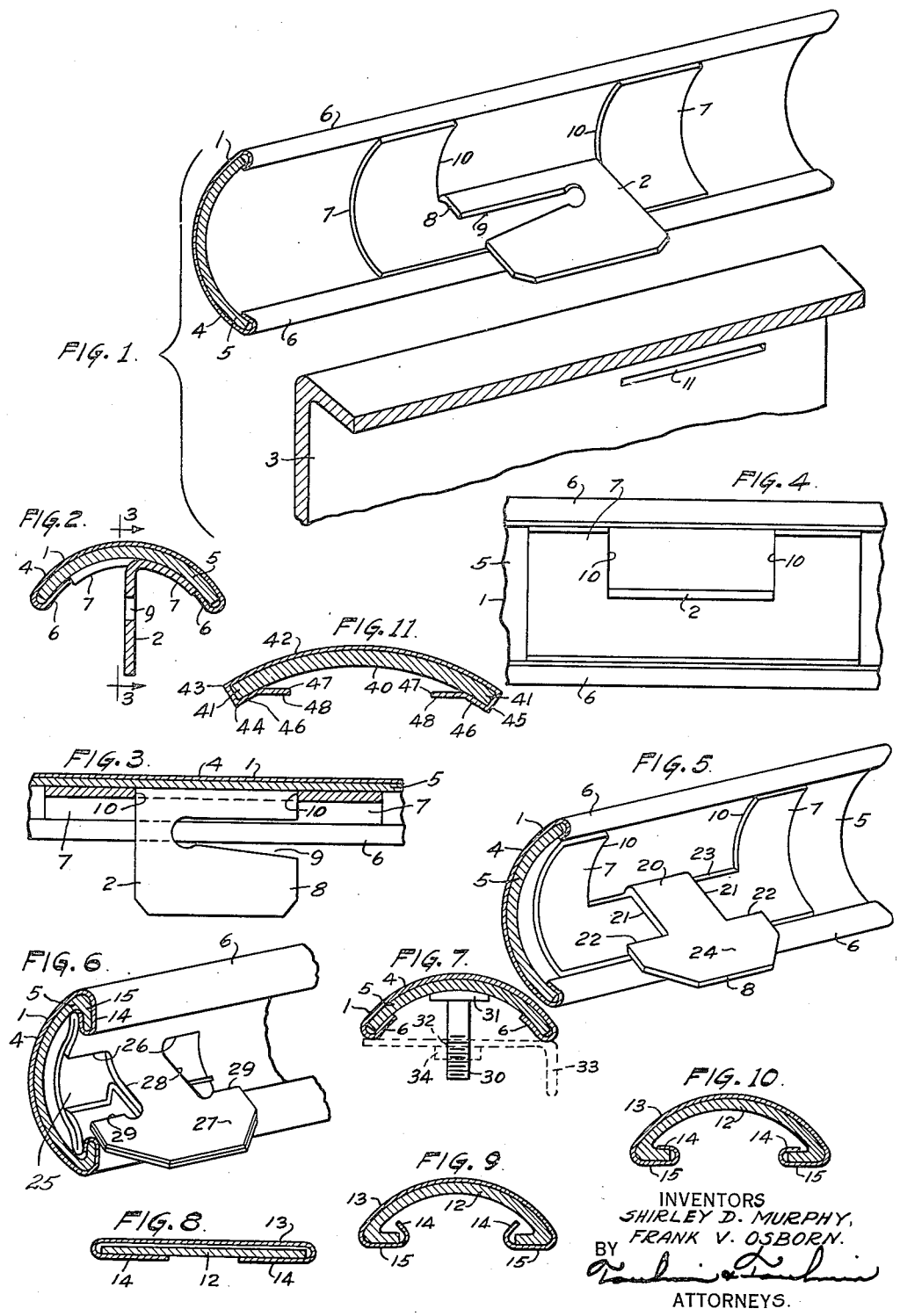
INVENTORS
SHIRLEY D. MURPHY,
FRANK V. OSBORN.
BY
ATTORNEYS.

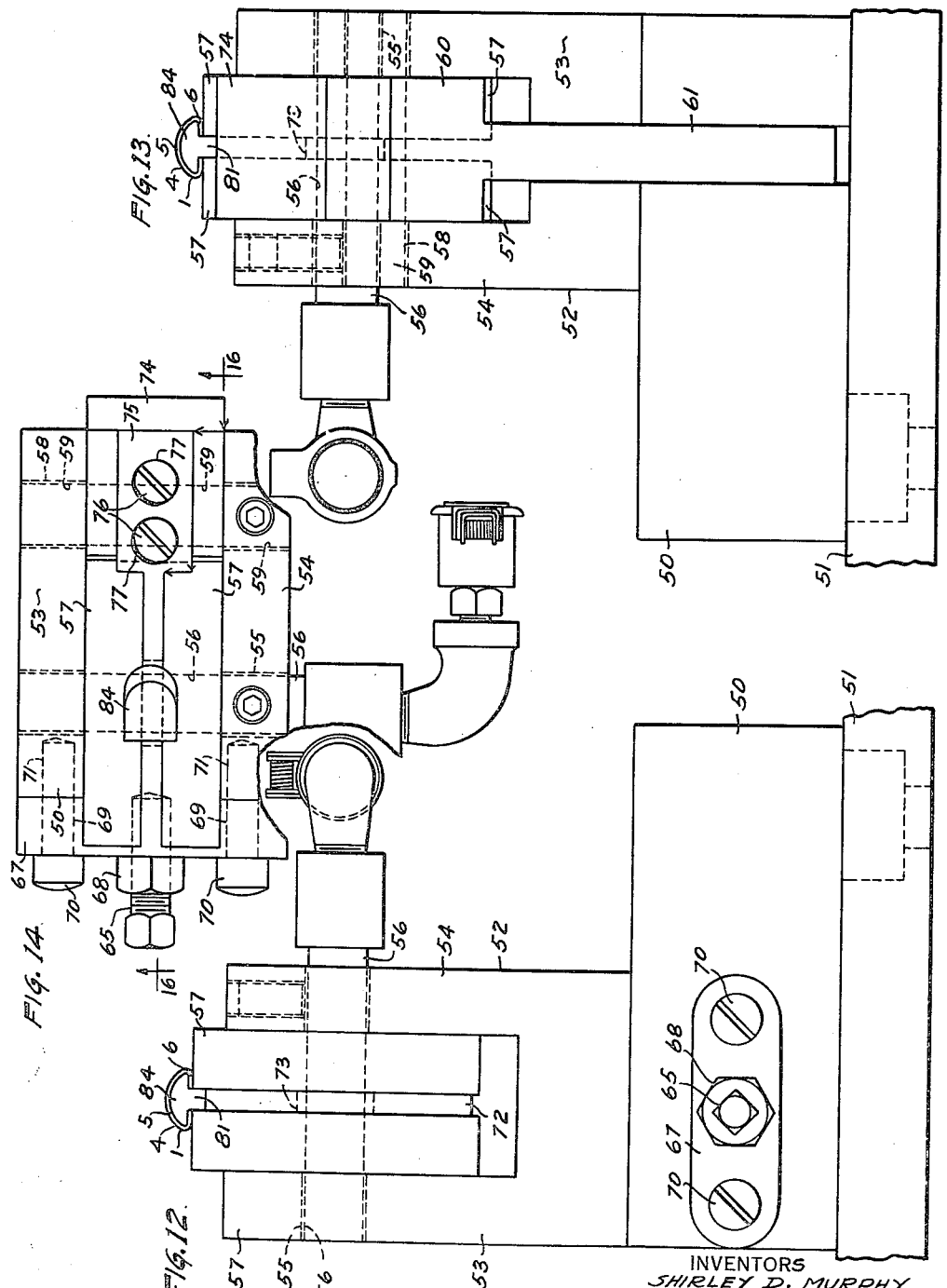

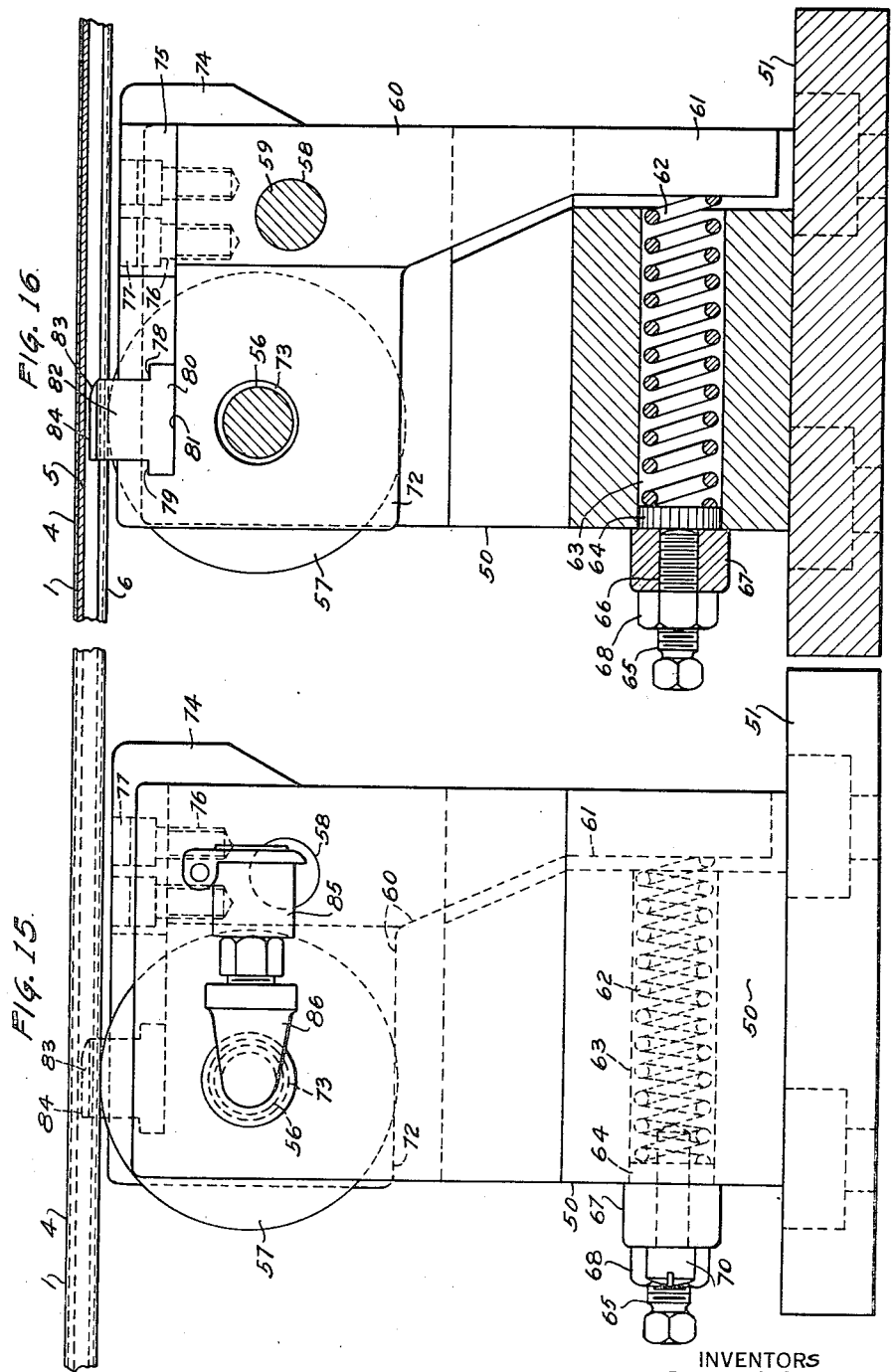

Patented Jan. 19, 1937

2,068,564

UNITED STATES PATENT OFFICE 2,068,564

METALWORKING APPARATUS

Shirley D. Murphy and Frank V. Osborn,
Indianapolis, Ind.

Original application May 28, 1935, Serial No. 23,888. Divided and this application December 18, 1935, Serial No. 55,038

9 Claims. (Cl. 153—1)

This invention relates to mouldings or similar members to be attached to various articles, and especially to an apparatus for making such mouldings. In particular, it relates to composite moulding strips having a surface layer or shell of different material from the material within the strip; and also to means for attaching such moulding strips to the article upon which they are mounted.

One object of our invention is to provide a moulding member composed of dissimilar materials, such as a layer or shell of corrosion-resisting metal laid over a base metal and having a fastening portion on the under side of the shell metal.

Another object is to provide means of making a composite moulding by rolling a thin shell around a flat base portion, then forming this assembly to the final configuration desired, and afterward pressing down the edges of the shell so that they lie flat against the base portion.

Another object is to provide means of making a moulding strip by rolling a thin strip of metal around a thicker flat base metal strip so that the edges of the shell bend around and lie flat against the opposite side of the base portion; then forming this assembly into a convexed form, thereby stretching the shell over the base metal and giving a smooth tightly-attached surface without indentations or irregularities; and afterward clinching the edges of the metal shell to cause them to lie flat against the base portion, these edges having been raised slightly during the operation of stretching the shell over the base portion.

Another object is to provide apparatus whereby the metal shell is caused to lie flat against the base portion.

Another object is to provide apparatus whereby the metal shell is tightly stretched over the base metal and its edges caused to firmly press over the adjacent edges of the base metal.

This application is a division of our copending application, Ser. No. 23,888, filed May 28, 1935.

In the drawings:

Figure 1 is a bottom perspective view of the moulding member made by the method and apparatus of our invention, showing the fastener and a portion of the article to which the moulding member is to be attached.

Figure 2 is a cross section through the moulding member shown in Figure 1, looking toward the closed end of the fastener notch.

Figure 3 is a vertical longitudinal section through the moulding member shown in Figure 2, taken along the line 3—3 thereof.

Figure 4 is a bottom plan view of the moulding member shown in Figures 1 to 3, inclusive.

Figure 5 is a bottom perspective view of a modified form of moulding member, showing a different type of fastener from that employed in Figure 1.

Figure 6 is a bottom perspective view of another modified form of moulding member, wherein the fastener slidably engages the remaining portion of the moulding member.

Figure 7 is a section through another modified form of moulding member, wherein the fastener consists of a screw, nail, rivet or cotter pin fixedly secured to the base portion of the moulding member.

Figure 8 is a diagrammatic view showing the first step in the method of making the moulding member of our invention.

Figure 9 is a view similar to Figure 8, but illustrating the method step of forming the moulding into its convexed shape, thereby stretching the surface shell tightly over the base portion.

Figure 10 is a view similar to Figures 8 and 9, but showing the additional method operation of rebending the edges of the surface shell, which have been somewhat raised during the stretching operation, so that these edges again lie flat upon the base portion.

Figure 11 is a section through another modified form of moulding member, wherein the inner edges of the metal shell serve as flanges for the attachment of the moulding member to the article upon which it is used.

Figure 12 is a rear end elevation of apparatus for stretching and turning over the edges of the metal shell upon the base portion.

Figure 13 is a front end elevation of the apparatus shown in Figure 12.

Figure 14 is a plan view, partly broken away, of the apparatus shown in Figures 12 and 13.

Figure 15 is a right-hand side elevation of the apparatus shown in Figure 12.

Figure 16 is a vertical section along the irregular line 16—16 of Figure 14.

In general, the device made according to our invention consists of a moulding member, usually an elongated strip, and having fasteners secured to the underside thereof for attachment to the article upon which it is mounted. The moulding portion itself consists of a base portion having a thin strip of different material stretched tightly over it and with the edges thereof lying flat against the underside of the base portion. The surface shell is preferably of a material of non-corrosive and/or highly ornamental properties, whereas the base portion is of a less expensive but sufficiently strong material to serve the purpose.

The fastener is secured to the underside of the moulding, and is preferably of such a form that it can be instantly fitted into place and tightened either by the mounting operation, or by a simple manipulation of the fastener, as hereinafter described. Moulding members of this type are found highly useful in automobile bodies, radiators or running-boards; and also on refrigerators, show-cases, boilers, stoves and other articles whereon such a moulding might be employed.

Referring to the drawings in detail, Figure 1 shows the moulding member of our invention as consisting of the moulding proper, generally designated 1, and the fastener, generally designated 2. Also shown in Figure 1, in somewhat diagrammatic form, is a portion, generally designated 3, of the article to which the moulding is intended to be attached, a portion of an automobile running-board being shown for convenience. The moulding proper 1 consists of an outer shell 4 and an inner base portion 5, associated therewith. The edge portions 6 of the outer material 4 are bent around the edges of the base portion 5 in such a manner as to lie evenly against it.

The outer portion comprising the shell 4 is preferably of a non-corrosive and ornamental material, such as stainless steel. Since this material is very expensive, the provision of a thin layer thereof results in a great economy as compared with the cost of making the entire moulding from such material. At the same time, however, the base portion 5 is made of a cheaper material with a sufficient strength and of an edequate thickness to provide rigidity, a suitable material for this purpose being cold-rolled steel. The composite or laminated construction of our invention thus provides an article of the same appearance as if it were made of expensive surface material throughout, and having sufficient strength yet without the high cost.

The moulding portion 1 is attached to the article 3 by means of fasteners 2 secured thereto. The fastener shown in Figure 1 consists of a piece of metal having a bent portion 7 formed with a configuration corresponding to that of the base portion 5, so as to fit snugly against the latter. Projecting from the bent portion 7 is a portion 8 having a notch 9 with inclined edges, thereby forming a wedge-shaped notch. In the fastener 2 of Figure 1, the projecting portion 8 is made integral with the bent portion 7 by first cutting slits along the lines 10 and then bending the portion 8 outward, the lines 10 then becoming the inner edges of the bent portion 7.

The fastener 2 is fixedly secured to the base portion 5 in any suitable manner, welding having been found satisfactory for this purpose. In practice, these fasteners 2 are secured to the moulding portion 1 at predetermined intervals, and are then welded in position. These intervals are preferably of the same spacing, or at least of a known spacing, so that the article 3 may be provided with suitably spaced apertures 11 for receiving the projecting portions 8 of the fasteners 2. By this construction, the moulding assembly, consisting of the moulding portion 1 and the fasteners 2, may be completely manufactured in one factory and thereafter attached to articles 3 in another factory merely by providing the slots 11 in the article, and without any necessity on the part of the operator, of spacing or assembling the fasteners 2 with respect to the moulding portion 1.

In mounting the moulding of our invention upon the article 3, the operator merely aligns the moulding with the projecting portions 8 of the fastener opposite the apertures 11 in the article 3. He then pushes the fastener portions 8 through the apertures 11 and slides the moulding endwise. This sliding causes the wedge-shaped slot 9 to engage the ends of the aperture 11 in such a manner as to draw the moulding firmly against the article 3.

The modified form of moulding member shown in Figure 5 is similar in principle to that shown in Figures 1 to 4, inclusive, but is provided with a fastener of somewhat different construction. This fastener consists, as before, of a bent portion 7 and a projecting portion 8 formed therefrom by slotting the bent portion 7 along the lines 10. The projecting portion 8, however, is subjected to the removal of additional material so that it is given a shape roughly resembling the capital letter T. The upright portion 20 of this T-shaped projection 8 is formed by additionally slotting the metal along the lines 21, 22 and 23, thereby cutting out rectangular pieces of metal. The fastener is then welded or otherwise fixedly secured to the base portion 5 in the manner previously described. In assembling the modified moulding shown in Figure 5, the forward portions 24 of the projections 8 are slipped through the slots 11 and twisted on the opposite side thereof, as by the use of pliers. This twisting operation also tends to draw the moulding portion 1 tightly against the article 3 upon which it is mounted.

The modified form of moulding member shown in Figure 6 is likewise for a similar purpose as that shown in Figure 1, and similar parts are given corresponding numerals. In the Figure 6 modification, however, the edges 15 of the base portion 5 are flanged and the edges 14 of the surface material bent around these flanges. The fastener is of a type generally similar to that shown in Figure 5, but its bent portion 25 is adapted to slide in the guideways provided between the flanged edges 15 and the inner surface of the base portion 5. It will also be observed that the fastener of Figure 6 is made from a single piece of metal, bent into suitable form. To this end the metal is slotted to remove a portion thereof, as at 26. The ends are then bent around to form the T-shaped projection 27, after removing metal along the lines 28 and 29 in a manner similar to that described in connection with the fastener of Figure 5.

The modified form of moulding shown in cross section in Figure 7 has a moulding portion 1, generally similar to that shown in Figure 1. The moulding portion 1 is attached to the article 33, however, by means of a bolt, screw, cotter pin, rivet, nail, or similar member, generally designated 30. The head 31 of the member 30 is fixedly secured to the base portion 5, as by welding, and these members 30 are distributed at intervals along the strip. A series of round apertures 32 is then formed in the article 33 to which the device is to be attached; the ends of the bolts or other members 30 are slipped through these holes and the proper operation performed to secure these in place. In the moulding shown in Figure 7 a bolt has been illustrated, together with a nut 34 on the opposite side of the member 33.

but it will be understood that a rivet or cotter pin could be employed, with the ends thereof upset, enlarged, or bent apart in any suitable way.

The modified form of moulding member shown in Figure 11 is similar to that shown in Figure 1, with the exception of the fact that the edges of the metal shell are employed as flanges for the attachment of the entire member to the article upon which it is to be used. To this end the base portion 40 is provided either with rounded ends, as previously described and shown in Figure 1, or preferably with flat ends 41 upon which the metal shell 42 is bent, as at the corners 43 and 44, to form edge portions 45. The portions 46 nearest the corners 44 are pressed into close engagement with the inner side of the base portion 40. The edges 47 of the metal shell, however, are bent away from the base portion 40 to form flanges 48. By means of these flanges 48 any suitable fastener, such as 2, shown in Figure 2, may be inserted and employed to hold the moulding in engagement with the article, such as 3 (Figure 1), in connection with which it is to be used.

In making the moulding portion, generally designated 1, the steps or operations diagrammatically shown in Figures 8 to 10 are followed. In this method a flat strip 12 of the base material and a thin strip 13 of the cover or surface material are rolled together so that the edges 14 of the latter are bent around the former and lie flat against it.

The article shown in Figure 8 is then subjected to a further rolling operation to give it any desired convex shape, the curved shape shown in Figure 9 being chosen for purposes of illustration. This operation causes the surface material 13 to be stretched tightly over the base material 12, due to the fact that it extends over a greater distance than the inner material 12, whereas the edges of the latter serve somewhat to clamp the edges of the surface shell 13 during this operation. To some extent, however, the edges 14 become bent upward during this operation, as shown in Figure 9. Accordingly, the article is now subjected to a further rolling operation to cause these edges 14 to lie flat against the inner surface of the base portion 12.

During the above operations the base portion 12 has been provided with flanges 15 along its edges, these being intended to serve the purpose of the construction shown in Figure 6. When the edges 14 of the surface material are again pressed into position after the convexing operation shown in Figure 9, the edges 14 are pressed firmly down against the inner surfaces of the flanged edges 15 on the base portion 12. It will be understood, however, that the flanged edges 15 are omitted when the moulding of the type shown in Figure 1 is made, the edges 6 being folded down against the edge of the base portion 5. It will be further understood that the shape of the moulding may be of any desired form and not necessarily of a cylindrical configuration, as shown in the figures. The moulding, for example, may have flat or bevelled portions instead of the curved surfaces, shown in the drawings. Such flat or beveled mouldings have been found suitable for showcases.

At the same time, our provision of a composite moulding made by mechanically rolling a thin surface portion over a thicker base portion avoids the irregularities which would be present in welding such a coating to a base portion. The welding or other heat-attaching operation would tend to make the surface coating of an unequal thickness and of varying strength, as well as to cause heat injury or discoloration to the surface portion. In welding also the stretching effect of the surface coating over the base portion would be absent since the heat would release the tension. Accordingly, surface irregularities would tend to be present in a much greater degree than in the stretched surface coating of our invention.

Electroplating methods of depositing a surface coating also tend to result in a surface coating of uneven thickness and one which depends for its grip upon the perfect engagement of the coating with the base material. To obtain the surface coating of the same thickness, as provided in our invention, the electroplating operation would also need to be unduly protracted so as to deposit a sufficiently thick layer of metal, and this operation would therefore be very expensive.

The apparatus for transforming the metal shell and base from the position shown in Figure 9 to that shown in Figure 10 comprises the clinching device illustrated in Figures 12 to 16, inclusive. It will be understood that the apparatus for transforming the flat composite strip of Figure 8 into the curved strip of Figure 9 consists of cooperating grooved rolls of the kind known to those skilled in the art.

The apparatus consists of a base 50 which is adapted to be mounted upon the bed 51 of the rolling machine. The details of the rolling machine are not shown, but merely comprise well known means for feeding the composite metal strip to and from the apparatus shown in Figures 12 to 16. The base 50 is provided with an upright portion 52, having spaced arms 53 and 54 projecting upwardly therefrom (Figure 12). These arms are bored, as at 55, to receive the shaft 56. The latter serves to provide support for the rollers 57. The spaced arms 53 and 54 are also additionally bored, as at 58 (Figures 15 and 16) to receive the shaft 59. The latter serves as a pivot shaft for an L-shaped member, generally designated 60 (Figure 16). The lower arm 61 of this L-shaped member is engaged by a coil spring 62 mounted in the bore 63 of the base 50. The opposite end of this coil spring 62 is provided with a cap 64, engaged by an adjusting screw 65, positioned within the threaded bore 66 in the cross arm 67. A locknut 68 holds the adjusting screw in any desired position.

The ends of the cross arm 67 are bored, as at 69, (Figure 14) so as to receive screws 70 which enter the threaded holes 71 in the base 50 and hold the cross arm 67 firmly against the base 50. The upper arm 72 of the L-shaped member 60 (Figure 16) is provided with an enlarged hole 73, surrounding the roller shaft 56 and spaced apart therefrom by a sufficient distance to permit a certain amount of adjustment of the L-shaped member 60 around its pivot shaft 59 without engaging the roller shaft 56.

The L-shaped member 60 is provided with an abutment 74 (Figures 15 and 16), which serves as a stop for the end of the former 75 (Figures 14 and 16). The former clamping member 75 is secured to the member 60 by means of the screws 76 in the countersunk recesses 77 in the top surface of the former clamping member. The end of the clamping member 75 is provided with an offset shoulder 78, whereas the upper portion of the upper arm 72 is likewise provided with a shoulder 79. These shoulders overhang to provide a T-shaped transverse slot arranged to receive the base 80 of the former, generally designated 81 (Figure 16).

The former 81 is provided with an upright portion 82 which serves to support the forming portion proper 83. The latter consists of a transverse member having a forwardly beveled portion 84 (Figure 14) so that it and the upright portion 82 are T-shape in cross section.

In the use of the apparatus shown in Figures 12 to 16, inclusive, the moulding member of Figure 9, with its inner edges 14 turned up, as shown, is fed over the former 81 so that the upper portion 83 thereof enters the internal part of the moulding. As the moulding is moved over this member 83, the edges 14 of the shell 13 (Figure 9) are forced firmly into engagement with the adjacent edges of the metal shell, stretching the shell 13 tightly over the metal base 12 and forcing the edges 14 into firm contact therewith, as shown in Figure 10. The rollers 57, meanwhile, serve to assist the passage of the moulding over the former portion 84 and the lubricating cup, generally designated 85, serves to provide lubricant through the elbow 86, to the interior of the roller shaft 56. The former portion 83 is forced downward toward the top of the rollers 57 by the action of the coil spring 62 (Figure 16), whose tension may be adjusted by moving the screw 65.

It will be understood that we desire to comprehend within our invention such modifications as may be necessary to adapt it to varying conditions and uses.

Having thus fully described our invention, what we claim as new and desire to secure by Letters Patent is:

1. A clinching device for the manufacture of composite metal mouldings comprising a T-shaped former having the head portion thereof adapted to enter the channel on the underside of said moulding to press the edges of the covering portion firmly against the inner side of the base portion, and a roller positioned on each side of said former and beneath the head portion thereof, said rollers being arranged to engage the external side of said moulding while the head portion of the former presses the covering portion thereof internally against the base portion.

2. A clinching device for the manufacture of composite metal mouldings comprising a T-shaped former having the head portion thereof adapted to enter the channel on the underside of said moulding to press the edges of the covering portion firmly against the inner side of the base portion, guiding means adjacent said former for guiding the moulding as it passes over the former, and yielding means urging said former toward said guiding means.

3. A clinching device for the manufacture of composite metal mouldings comprising a T-shaped former having the head portion thereof adapted to enter the channel on the underside of said moulding to press the edges of the covering portion firmly against the inner side of the base portion, a roller positioned on each side of said former and beneath the head portion thereof, said rollers being arranged to engage the external side of said moulding while the head portion of the former presses the covering portion thereof internally against the base portion, and yielding means urging said former toward said rollers.

4. A clinching device for the manufacture of composite metal moulding comprising a T-shaped former having the head portion thereof adapted to enter the channel on the underside of said moulding to press the edges of the covering portion firmly against the inner side of the base portion, and guiding means for guiding the moulding as it passes over the former, said head portion having its forward edge beveled to provide a wedging action when inserted within said moulding.

5. A clinching device for the manufacture of composite metal mouldings comprising a T-shaped former having the head portion thereof adapted to enter the channel on the underside of said moulding to press the edges of the covering portion firmly against the inner side of the base portion, guiding means for guiding the moulding as it passes over the former, said head portion having its forward edge beveled to provide a wedging action when inserted within said moulding, and yielding means urging said head portion toward said guiding means.

6. A clinching device for the manufacture of composite metal mouldings comprising a T-shaped former having the head portion thereof adapted to enter the channel on the underside of said moulding to press the edges of the covering portion firmly against the inner side of the base portion, a roller positioned on each side of said former and beneath the head portion thereof, said rollers being arranged to engage the external side of said moulding while the head portion of the former presses the covering portion thereof internally against the base portion, said head portion having its forward edge beveled to provide a wedging action when inserted within said moulding, and yielding means arranged to urge said head portion toward said rollers.

7. A clinching device for the manufacture of composite metal mouldings comprising a T-shaped former having the head portion thereof adapted to enter the channel on the underside of said moulding so as to press the edges of the covering portion firmly against the inner side of the base portion, a support, a pivot in said support for said former, guiding means arranged between said former and said support, and means to urge said former toward said guiding means.

8. A clinching device for the manufacture of composite metal mouldings comprising a T-shaped former having the head portion thereof adapted to enter the channel on the underside of said moulding so as to press the edges of the covering portion firmly against the inner side of the base portion, a support, a pivot in said support for said former, guiding means arranged between said former and said support, and yielding means to urge said former toward said guiding means.

9. A clinching device for the manufacture of composite metal moldings comprising a former arranged to extend within the base member of the molding and provided with portions which extend over the edges of the base member for a substantial distance and conform to the shape of the base member, and yieldingly mounted means for pressing the edges of the covering of the molding, when assembled on the base member with its edges extending within the base member, into engagement with said former and to thereby force the edges of the covering into engagement with the base member.

SHIRLEY D. MURPHY.
FRANK V. OSBORN.